United States Patent [19]
Kobayashi et al.

[11] Patent Number: 4,853,918
[45] Date of Patent: Aug. 1, 1989

[54] TRACKING SERVO USES TANGENT FUNCTION TO DETERMINE TRACKING ERROR SIGNAL

[75] Inventors: Seiji Kobayashi, Tokyo; Norio Nishida, Kanagawa, both of Japan

[73] Assignee: Sony Corporation, Tokyo, Japan

[21] Appl. No.: 145,308

[22] Filed: Jan. 19, 1988

[30] Foreign Application Priority Data

Jan. 22, 1987 [JP] Japan .................................. 62-12716

[51] Int. Cl.$^4$ .............................................. G11B 7/00
[52] U.S. Cl. ..................................................... 369/44
[58] Field of Search ................................. 369/43–47; 358/342

[56] References Cited

U.S. PATENT DOCUMENTS 4,190,859  2/1980  Kinjo ....................................... 369/43
4,530,079  7/1985  Millar ...................................... 369/44
4,539,665  9/1985  Iso et al. ................................. 369/44

FOREIGN PATENT DOCUMENTS 0068124  1/1983  European Pat. Off. .
0069549  1/1983  European Pat. Off. .
8703130  5/1987  PCT Int'l Appl. .
2085189  4/1982  United Kingdom .

*Primary Examiner*—Robert L. Richardson
*Attorney, Agent, or Firm*—Lewis H. Eslinger; Jay H. Maioli

[57] ABSTRACT

A tracking servo follows recording tracks formed in a recording medium. A signal proportional to a displacement from a recording track in a track pitch direction of the recording track is used as a displacement signal, so that following a given track or jumping to a new track position can be stably and easily performed.

6 Claims, 5 Drawing Sheets

TRACKING SERVO USES TANGENT FUNCTION TO DETERMINE TRACKING ERROR SIGNAL

BACKGROUND OF THE INVENTION

1. Field of the Invention:

The present invention relates to a tracking servo apparatus for performing tracking servo with respect to a recording medium having recording tracks.

2. Description of the Prior Art:

In order to perform recording/reproducing of data along a recording track in a non-contact state with respect to a recording medium such as an optical disk, tracking servo must be performed to track a beam spot along the recording track.

In a conventional tracking servo apparatus, a tracking error signal obtained when a beam spot crosses a track has a waveform as a signal $V_P$ of FIG. 1A. Assuming that a displacement of the beam spot from the track center is x and a track pitch is p, the signal $V_P$ is given by the following equation:

$$V_p = A\sin\left(2\pi \frac{x}{p}\right)$$

In this case, tracking servo is performed so that the signal $V_P$ becomes 0.

A track jump for moving a beam spot to an adjacent track or another track separated by several tracks to perform data recording/reproducing is performed as follows in the conventional tracking servo apparatus.

First the beam spot is moved close to a target track in an open-loop state wherein tracking servo is turned off. Then, tracking servo is turned on to track the beam spot to the target track.

However, the signal $V_P$ is a sine wave and hence cannot be uniquely determined with respect to the displacement x, as shown in FIG. 1A. The signal $V_P$ is uniquely determined with respect to the displacement x only in the hatched regions in FIG. 1A. That is, the beam spot can stably follow the track only when it is located in the hatched regions in FIG. 1A.

If the displacement x is large and the beam spot is located outside the hatched regions, tracking servo is destabilized or oscillated. Such a state tends to occur especially when a relative moving speed of the beam spot in a track pitch direction is large as in a track jump.

For example, this is a case wherein an error is produced in a moving distance of the beam spot when a track jump is performed with tracking servo off, and tracking servo is turned on outside the hatched regions in FIG. 1A.

In this case, since tracking servo cannot be easily stabilized after a track jump, it takes a long period of time to track the beam spot to the target track. In addition, the beam spot may be undesirably tracked to a track other than the target track. At this time, a track jump must be performed again.

SUMMARY OF THE INVENTION

It is, therefore, an object of the present invention to provide a tracking servo apparatus which comprises circuit means for obtaining a signal proportional to a displacement from a recording track in a track pitch direction of the recording track and performs tracking servo using the signal as an error signal.

In the tracking servo apparatus according to the present invention, since the error signal for performing tracking servo is proportional to the displacement from the recording track, the error signal can be uniquely determined with respect to the displacement.

Since the error signal is uniquely determined with respect to the displacement from the recording track as described above, a track jump can be performed simultaneously with tracking servo by changing a target value of tracking servo.

In addition, the error signal is proportional to the displacement from the recording track, i.e., the error signal has linearity.

In the tracking servo apparatus according to the present invention, since the error signal is uniquely determined with respect to the displacement from the recording track, tracking to a target track can be stably performed.

Since a track jump can be performed simultaneously with tracking servo, it can be stably performed.

Furthermore, since the error signal has linearity, tracking to a target track or a track jump can be easily performed.

DETAILED DESCRIPTION OF THE PREFERRED EMBODIMENT

An embodiment of the present invention in which the present invention is applied to an optical disk player will be described below with reference to FIGS. 1A to 7.

Figure 2:
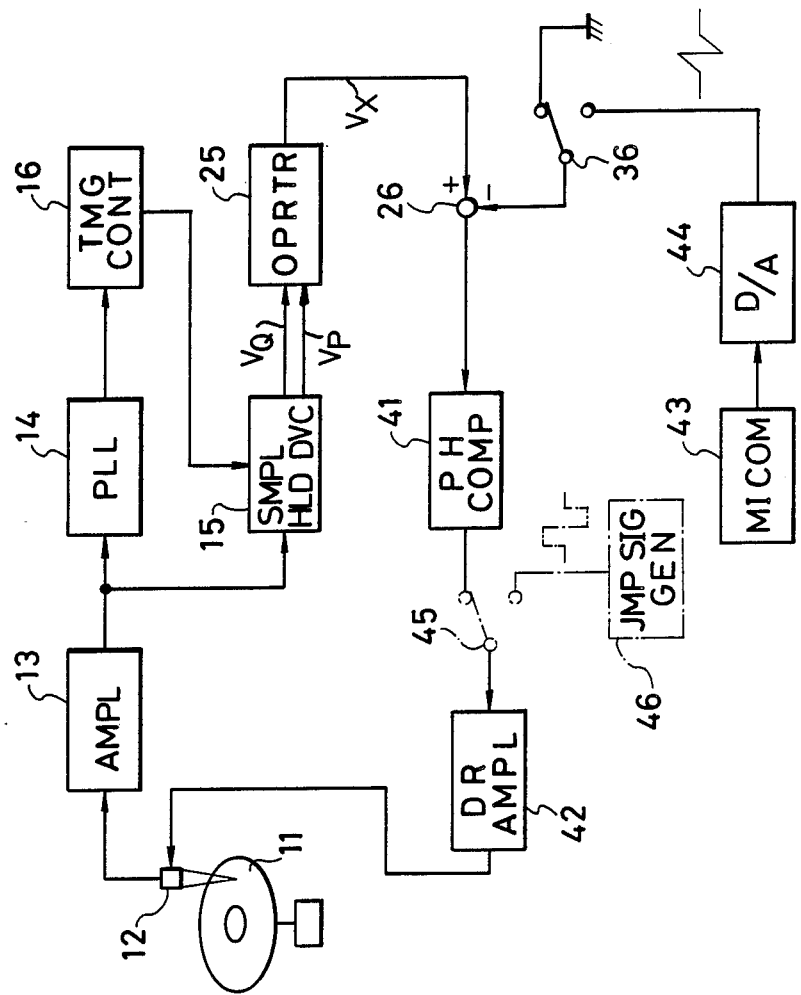
FIG. 2 is a block diagram of an overall arrangement of the embodiment.

FIG. 2 shows an entire arrangement of the embodiment. In this embodiment, a signal read out from an optical disk 11 by an optical pickup 12 is amplified by an amplifier 13 and then supplied to a PLL 14 and a sample hold device 15.

A clock signal is reproduced from the signal supplied to the PLL 14. On the basis of this clock signal, a timing controller 16 supplies a timing signal required for sampling to the sample hold device 15.

Figure 3:
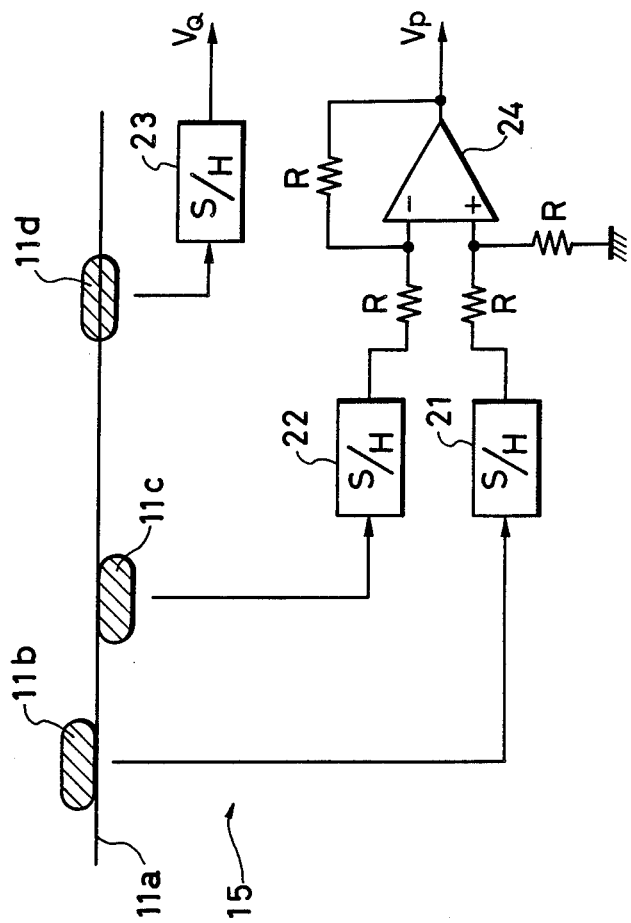
FIG. 3 is a block diagram of a sample hold device.

FIG. 3 shows an arrangement of the sample hold device 15. The sample hold device 15 has three sample hold circuits 21 to 23 and an operational amplifier 24.

As shown in FIG. 3, the optical disk 11 has tracking pits 11b and 11c offset from each other about the center of a track 11a in opposite directions by a ¼ track pitch and sequentially recorded along the track 11a, and a clock pit 11d recorded subsequently to the tracking pits 11b and 11c.

The sample hold circuits 21 and 22 sample-hold signals from the tracking pits 11b and 11c, respectively. Therefore, the operational amplifier 24 outputs a signal $V_P$ shown in FIG. 1A in accordance with a tracking error.

The sample hold circuit 23 sample-holds a signal from the clock pit 11d and outputs a signal $V_Q$ shown in FIG. 1B in accordance with the tracking error.

The signal $V_Q$ is represented by $$V_Q = A\cos\left(2\pi \frac{x}{p}\right) + C$$

and has a phase shift of 90° with respect to the signal $V_P$.

In this case, assuming that $$V_Q' = V_Q - C = A\cos\left(2\pi \frac{x}{p}\right),$$

the followig equation is obtained:

$$\frac{V_p}{V_Q'} = \frac{A\sin\left(2\pi \frac{x}{p}\right)}{A\cos\left(2\pi \frac{x}{p}\right)}$$

Therefore, assuming that a signal representing a displacement x is $V_X'$, the signal $V_X'$ is given as follows:

$$V_X' = \frac{p}{2\pi} \tan^{-1}\left(\frac{V_p}{V_Q'}\right) \quad \text{①}$$

FIG. 1C shows the signal $V_X'$. The signal $V_X'$ is proportional to the displacement x in principle in the range of $|x| < (p/4)$ but is discontinuous at the position of $|x| = (p/4)$. Therefore, if a signal $V_X$ shown in FIG. 1D is obtained by level-shifting the signal $V_X'$ in the range of $(p/4) \leq |x| < (p/2)$ as indicated by broken lines and arrows in FIG. 1C, this signal $V_X$ is proportional to the displacement x in the range of $\{x\{ < (p/2)$.

Accordingly, the signal $V_X$ is uniquely determined with respect to the displacement x of a beam spot regardless of the magnitude of the displacement x, that is, regardless of a position of the beam spot except for a position represented by $\{x\{ = (p/2)$, i.e., a middle position between tracks.

An operator 25 (FIGS. 2 and 4) receives the signals $V_P V_Q$ from the sample hold device 15 and supplies the signal $V_X$ as described above to a subtractor 26.

Note that in this embodiment, as is apparent from FIG. 3, the sample hold circuits 21 to 23 must be used because the optical disk 11 is used as a recording medium in which the tracking pits 11b and 11c and the clock pit 11d are preformed and therefore data can be recorded.

However, when a compact disk or a video disk which is put to practical use as a reproduction-only disk is used, a tracking error signal and a data reproduction signal, both of which are well known to those skilled in the art, can be used as the signal $V_P$ and the signal $V_Q$, respectively. Therefore, the sample hold circuits 21 to 23 need not be used.

Figures 4, 5A, 5B:
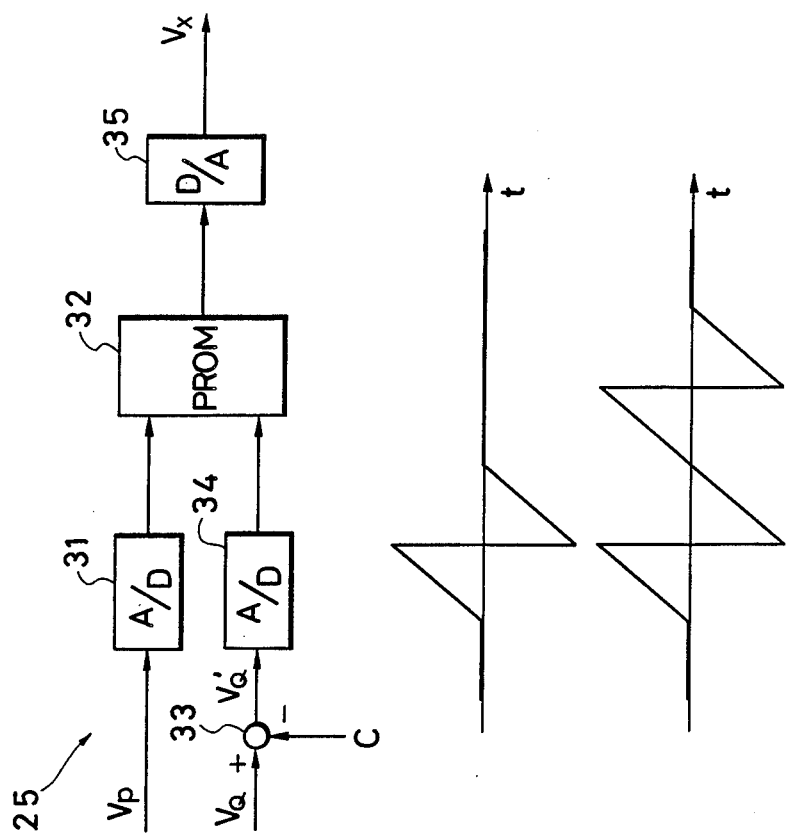
FIG. 4 is a block diagram of an operator.
FIGS. 5A and 5B are waveform charts of jump signals.

FIG. 4 shows an arrangement of the operator 25. In FIG. 4, the signal $V_P$ is supplied to a PROM 32 through an A/D converter 31. A signal $V_Q'$ obtained by subtracting a constant C from the signal $V_Q$ by a subtractor 33 is supplied to the PROM 32 through an A/D converter 34.

The PROM 32 such as a PROM 2732 has a table which satisfies a relationship shown in FIG. 1D with respect to the digitized signals $V_P$ and $V_Q'$ and supplies a signal obtained by looking up the table to a D/A converter 35.

Therefore, the D/A converter 35 outputs an analog signal $V_X$.

Note that other than digital processing as described above, equation ① may be operated directly by a trigonometric function operator already on the market as an analog IC and the signal $V_X'$ may be corrected to the signal $V_X$.

In this case, if the signal $V_Q$ is shifted beforehand in an analog manner by an amount of the constant C, an operation for subtracting the constant C from the signal $V_Q$ to obtain the signal $V_Q'$ need not be performed in equation ①. Therefore, the signal $V_Q$ can be directly used.

The subtractor 26 receives a signal representing a tracking target value by which the tracking beam is (a value to be displaced from the track 11a) through a switch 36. During normal tracking servo, i.e., when a beam spot accurately scans the track 11a, the signal representing the tracking target value is 0.

Therefore, the signal $V_X$ which is proportional to the displacement x is supplied from the subtractor 26 to the optical pickup 12 through a phase compensator 41 and a drive amplifier 42, thereby performing tracking servo.

In order to perform a track jump, the switch 36 is switched to a microcomputer 43 and a D/A converter 44 so that a signal generated by the microcomputer 43 and D/A-converted by the D/A converter 44 is input to the subtractor 26.

FIGS. 5A and 5B show such signals. FIG. 5A shows a signal obtained when a beam spot is jumped by one track, i.e., a beam spot is jumped to an adjacent track, and FIG. 5B shows a signal obtained when a beam spot is jumped by two tracks.

As is apparent from FIGS. 5A and 5B, each signal for a track jump has a waveform equal to the number of the signal $V_X$ obtained from the operator 25 and has the same number of waves as that of tracks to be jumped over.

Note that such a track jump is performed while tracking servo is kept on, i.e., in a closed loop state as is apparent from FIG. 2. However, as in a conventional apparatus, a track jump can be performed while tracking servo is kept off, i.e., in an open loop state.

In this case, the operator 25 is connected directly to the phase compensator 41 without using the subtractor 26, the switch 36, the microcomputer 43, and the D/A converter 44. In this case, as shown in FIG. 2, a switch 45 and a jump signal generator 46 are used.

A beam spot is jumped close to a target track in an open loop state wherein the switch 45 is switched to the jump signal generator 46, and the open loop state is switched to a close loop state at a position close to this target track.

Figure 1:
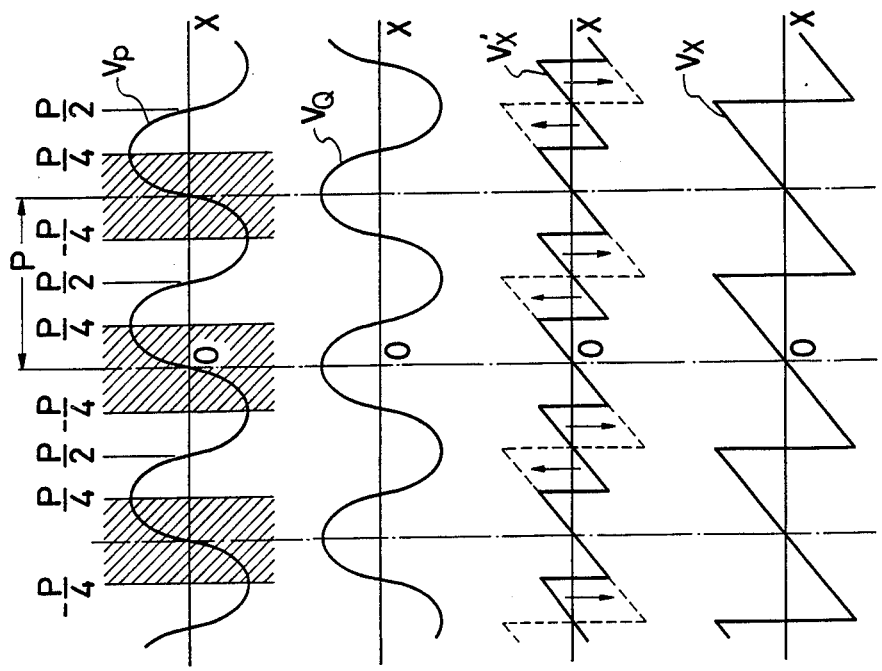
FIGS. 1A to 1D are waveform charts of various signals accordingto an embodiment of the present invention.

In this tracking operation, since the range in which tracking servo can be stably performed is also wider than that of the conventional apparatus as is apparent from FIG. 1, a track jump can be stably performed.

Figure 6:
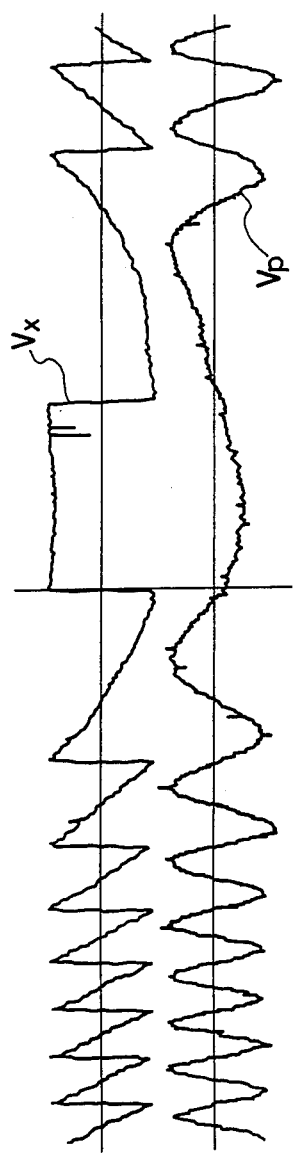
FIG. 6 is a waveform chart of various signals obtained when tracking servo is off.

FIG. 6 shows the signals $V_X$ and $V_P$ obtained ahead of and behind a turning point of a beam spot when tracking servo is kept off and the beam spot moves in a zig-zag manner with respect to a plurality of tracks 11a because the optical disk 11 is eccentric, in the embodiment as described above.

As is apparent from FIG. 6, when the beam spot moves in an opposite direction, the signal $V_X$ is inclined in an opposite direction.

Figure 7:
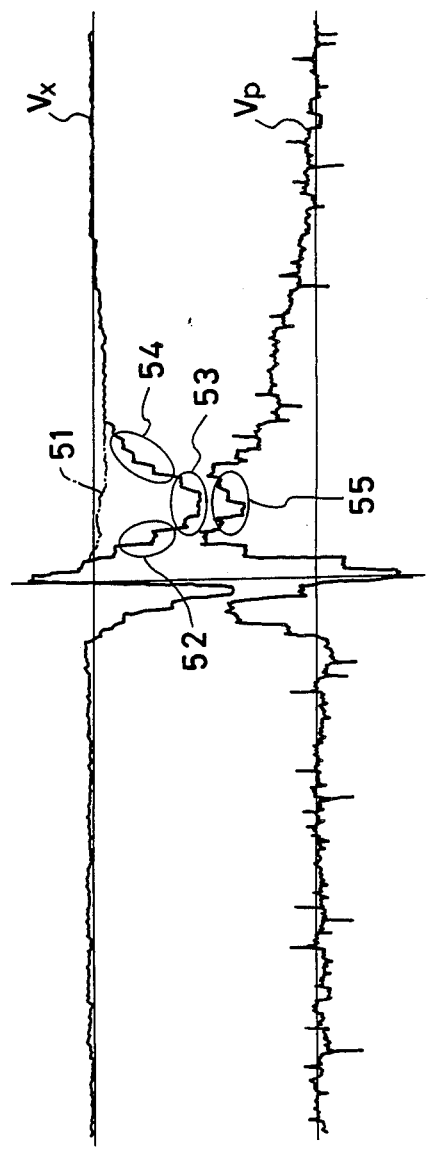
FIG. 7 is a waveform chart of various signals obtained when a track jump is performed.

FIG. 7 shows the signals $V_X$ and $V_P$ obtained when a gain of the jump signal shown in FIG. 5A is increased larger than normal and a beam spot is jumped to an adjacent track.

When the gain of the jump signal is normal, the beam spot is immediately tracked to the adjacent track, and the signal $V_X$ has a waveform 51 as indicated by an alternate long and short dashed line in FIG. 7.

When the signal $V_X$ indicated by a solid line in FIG. 6 is obtained, the gain of the jump signal is too large. Therefore, as is apparent from a waveform 52, the beam spot passes beyond the target track. However, as is apparent from a waveform 53, the beam spot falls in the range wherein it can be tracked. As is apparent from a waveform 54, the beam spot is subsequently returned to the target track.

On the contrary, according to the signal $V_P$, the beam spot falls outside the range wherein it can be tracked. Therefore, if the signal $V_P$ is an error signal, the beam spot may not have returned to the target track.

What is claimed is:

1. A tracking servo apparatus for performing tracking servo of a beam spot with respect to a recording medium having recording tracks, said apparatus comprising:

circuit means for generating a tracking error signal and a first signal having a phase shift of 90° with respect to the tracking error signal and producing a displacement signal based on said tracking error signal and said first signal proportional to a displacement of said beam spot from a given one of said recording tracks in a track pitch direction; and means responsive to said displacement signal for performing tracking servo, where the tracking error signal is Asin 2 ($x_2$/p) and the first signal is Acos 2 (x/p), p being the track pitch and x being the displacement of the beam spot from said given recording track.

2. An apparatus according to claim 1, wherein said circuit means further comprises level shifting means for level-shifting the displacement x when the displacement x is in the range of:

$$\frac{p}{4} \leq |x| < \frac{p}{2}$$

so that said displacement signal is uniquely determined for all absolute values of x up to p/2.

3. An apparatus according to claim 1, wherein said record medium is formed with tracking pits and clock pits and the tracking error signal is a signal obtained by sample-holding an output from an optical pickup supplied when the beam spot scans a tracking pit, and the first signal is a signal obtained by sample-holding an output from said optical pickup supplied when the beam spot scans a clock pit.

4. An apparatus according to claim 1, wherein said circuit means comprises means for generating a signal representing a tracking target value.

5. An apparatus according to claim 4, wherein the target value is set to be 0 so that the beam spot does not execute a track jump but accurately scans said given recording track.

6. An apparatus according to claim 5, wherein, when the beam spot is to be jumped from said given recording track to a different recording track, the target value is set to a value proportional to a displacement of said different recording track from said given recording track.

* * * * *